(No Model.)
J. F. NEWELL.
BEARING FOR SHAFTS.
No. 513,953. Patented Jan. 30, 1894.
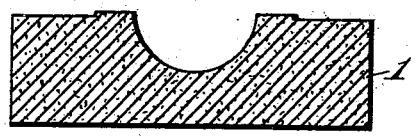
Witnesses.
Robt Emmett
A. H. Norris
Inventor.
John F. Newell.
By
James L. Norris.
Atty.

UNITED STATES PATENT OFFICE.

JOHN F. NEWELL, OF GARDINER, MAINE.

BEARING FOR SHAFTS.

SPECIFICATION forming part of Letters Patent No. 513,953, dated January 30, 1894.

Application filed May 27, 1893. Serial No. 475,771. (No model.)

*To all whom it may concern:*

Be it known that I, JOHN F. NEWELL, a citizen of the United States, residing at Gardiner, in the county of Kennebec and State of Maine, have invented new and useful Improvements in the Manufacture of Antirucking Bearings for Shafts, &c., of which the following is a specification.

The object of my invention is to produce bearings constructed of a material that can, while in a plastic state, be molded or compressed into any desired form or shape, and which, when hardened, will possess a high degree of hardness and resistance to crushing strain, while free from the tendency to cut or "ruck" the shaft if it should get dry, which is possessed by cast iron or other hard metal bearings. I attain this end by combining particles of finely divided or granulated metal such as cast iron, brass or any other suitable metal, with a plastic mass of non-metallic material which incloses the particles of metal and holds them firmly united, so that a mixture is obtained that, when hardened and consolidated by pressure and heat, possesses sufficient toughness, or tensile strength to resist shock or other mechanical violence to which it may be subjected, while retaining much of the hardness and capacity to resist crushing strain of the metals from which it is made. To impart to the material the property of "non-rucking" or non-cutting the shafts I add a certain proportion of powdered or granulated graphite or soapstone, talc, or other similar lubricating substance, to the plastic mass, or mixture in which the metallic particles are inclosed. The finished product has a texture in some respects analogous to that of hardened steel, being composed of hard metallic particles inclosed in a sponge or mass of tough material, while it possesses the advantage that should the bearings become dry the graphite or other lubricant will coat the metallic particles, destroy their adhesion to the metal of the shaft and thus prevent the "rucking" or cutting of the same. Bearings made from this material are not necessarily self-lubricating but are best used with oil or other lubricant.

The accompanying drawing illustrates a sectional view of one form of bearing made according to my invention, but obviously the form, shape, or configuration is immaterial and may be largely varied.

In carrying out my invention I proceed as follows, to wit:—I take of any suitable fibrous material such as asbestus, wood-pulp, or jute or linen pulp three parts; of plumbago or graphite nine parts; of powdered or granulated metal such as iron or brass, or any other suitable metal fifteen parts, either in the state of filings or otherwise finely divided, but I prefer to use the granulated material obtained by the process known as centrifugal granulation and consisting of smooth, rounded granules; of red lead, white lead, litharge or any other metallic oxide or carbonate capable of reacting with oils when subjected to heat and pressure so as to form a hard cement, a sufficient quantity. Thus if red and white lead be used with the foregoing proportions of fiber and metal I take of red lead three parts and of white lead two parts, or of either used alone five parts. I consider these proportions suitable for producing a good result but I do not confine myself to them as they may be varied greatly without affecting the spirit of my invention. In mixing these ingredients I first add to the white or red lead, or their equivalents, a sufficient quantity of any suitable oil such as linseed oil either raw, boiled or otherwise prepared, which may be reduced or thinned, if necessary, by the use of turpentine, benzine or other suitable solvent, so as to give a mixture of the consistence of ordinary paint. I then incorporate this mixture with the other constituents by grinding, kneading or other mechanical means or, if the proportions of the materials used are such as to make it difficult to secure a homogeneous mixture by such manipulation, I proceed as follows, to wit:—I first stir up the fibrous material and the plumbago or its equivalent with sufficient water to give a mass of creamy consistency. I then pour the before mentioned mixture of oil and red or white lead or their equivalents into the watery pulp and stir and agitate until a uniform mixture is obtained. I then add the finely divided metal and, when the mixture is complete, express the water, or I express more or less of the water from the pulpy mass before adding the metallic constituent. I then mold the mass obtained by either of the before named processes of mixing by strong pressure, preferably by the hydraulic press, into the desired shape or form and expose to a temperature of 270° Fahrenheit, more or less, to cause the oil and lead to combine and harden to a cement.

The result is a non-lubricating bearing, such as indicated by the numeral 1, in the drawing, which bearing possesses great strength and resistant properties and well adapted for use in heavy machinery to replace cast iron, Babbitt metal, &c.

Having thus described my invention, what I claim is—

1. The process or method herein described of manufacturing a material for bearings for shafts, axles and the like, which consists in combining granulated or finely divided metals with a hard tenacious including mass composed of fibrous material and a solid lubricant compacted by a cement formed within the pores or interstices of the mass during the process of manufacture substantially as set forth.

2. The process herein described of manufacturing a material for bearings for shafts, axles and the like, which consists, in mixing together, either with or without the aid of water, a fibrous material, an oil, a metallic oxide or carbonate or both, a solid lubricant and finely divided or granulated metal, and subjecting the mixture to pressure and heat substantially as set forth.

3. A material for the manufacture of bearings for shafts, axles and the like, consisting of metallic particles or granules inclosed in and disseminated through a mass consisting of fibrous material and a solid lubricant and a cement composed of an oil and a metallic oxide or carbonate or both, hardened and compacted by pressure and heat substantially as described.

4. A bearing for shafts, axles and the like consisting of metallic particles or granules inclosed in and disseminated through a mass composed of fibrous material and a solid lubricant cemented together by a compound of an oil and a metallic oxide or carbonate or both formed within the pores or interstices of the mass substantially as described.

5. A bearing for shafts and other purposes, consisting of metallic particles or granules, a fibrous material, a solid lubricant, and a binding material, substantially as described.

6. A material for shafts and other bearings, consisting of metallic particles or granules inclosed in and disseminated through a mass composed of fibrous material and a solid lubricant, and a cement, substantially as described.

In testimony whereof I have hereunto set my hand in presence of two subscribing witnesses.

JOHN F. NEWELL.

Witnesses:
GEO. E. S. CASE,
GILBERT S. SMITH.